March 12, 1935.  B. T. LEVEQUE  1,994,223
VALVE MECHANISM FOR INTERNAL COMBUSTION MOTORS
Filed Oct. 19, 1931
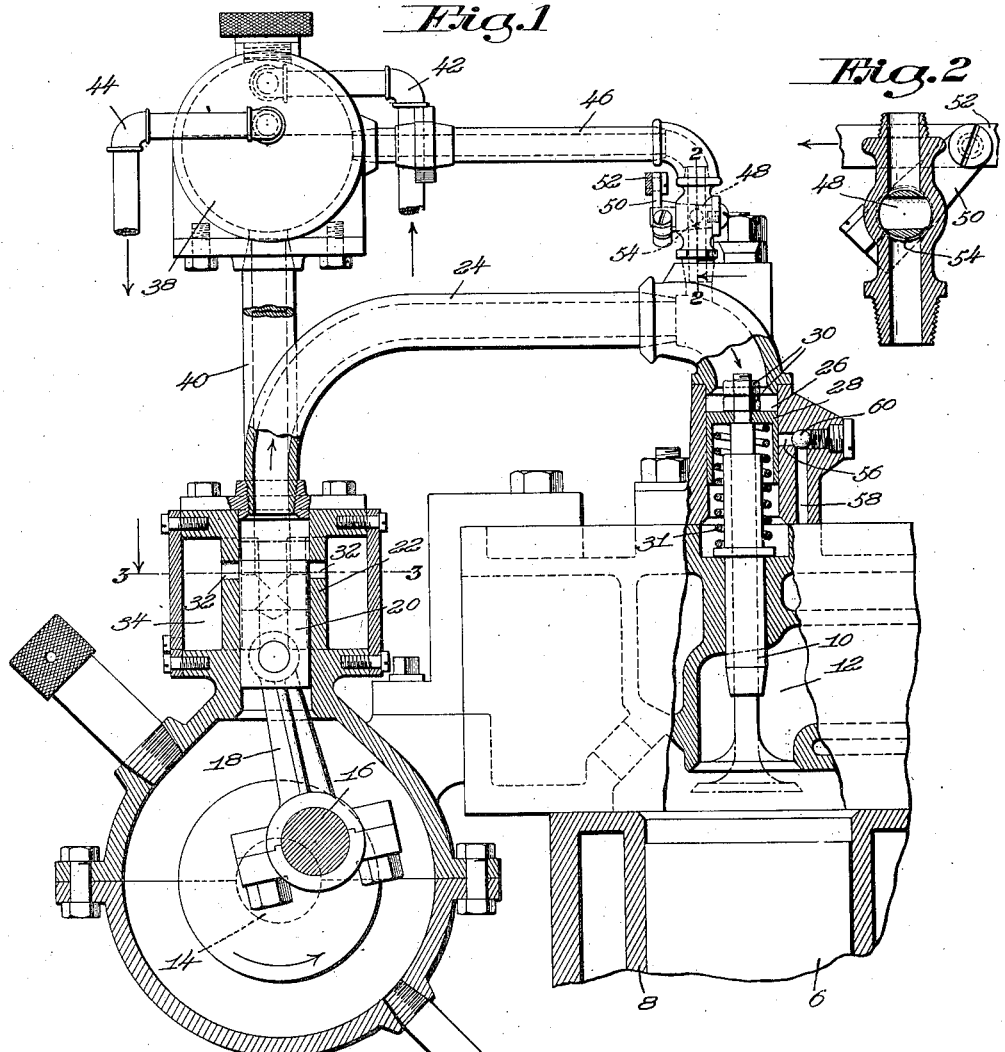

Patented Mar. 12, 1935

1,994,223

UNITED STATES PATENT OFFICE 1,994,223

VALVE MECHANISM FOR INTERNAL COMBUSTION MOTORS

Bernard T. Leveque, Wenham, Mass.

Application October 19, 1931, Serial No. 569,654

6 Claims. (Cl. 123—90)

The present invention relates primarily to valve mechanism for internal combustion motors although in certain aspects the invention embodies features of construction and arrangements of parts well adapted for use in operating parts other than the valves of internal combustion motors.

The invention has for its principal object the provision of an improved mechanism for operating the poppet valves of a four cycle internal combustion motor which will be simple in construction, smooth running and durable, and which will be free from many of the defects and objectionable features of the cam actuated poppet valve mechanism now universally used in internal combustion motors. Another object of the invention is to provide a simple and efficient crank operated mechanism by which a complete reciprocation can be imparted to a poppet valve or other movable member during a portion only of the revolution of the crank, and the valve or other member be allowed to remain stationary during the remaining portion of the revolution of the crank. Still another object of the invention is to provide a simple and improved means for regulating the amount of explosive gases admitted to the cylinders of a hydro-carbon motor and thereby the speed and power of the motor.

With the above and other objects in view, as will hereinafter appear, a feature of the invention contemplates the provision of an internal combustion motor having poppet valves, of a valve operating crank shaft, and connections between the crank shaft and each valve comprising means rendering the connections operative and inoperative during each revolution of the crank shaft to impart to the valve both an opening and a closing movement during substantially a quarter of a revolution of the crank shaft while permitting the valve to remain closed during the remaining three-quarters of a revolution of the crank shaft. Broadly considered, this feature of the invention contemplates any suitable form of connections between the crank shaft and the valves. In the preferred form of the invention these connections include a fluid conduit between the crank shaft and each valve, through which conduit a preferably non-compressible fluid such as oil is moved back and forth by the reciprocation of a plunger or piston connected to a crank on the crank shaft, movement of the oil in one direction operating through a piston connected to the valve to open the valve, and movement of the oil in the opposite direction operating to close the valve. Each actuating plunger or piston reciprocates in a cylinder and, in order to render the piston operative to move the oil in the conduit during a portion only of the rotation of the crank, the cylinder wall is provided with a port or ports which are uncovered or open during substantially three-quarters of a revolution of the crank shaft, and which are closed by the piston during the remaining one-quarter revolution of the crank shaft. Thus, during three-quarters of a revolution of the crank shaft, oil is permitted to flow freely into and out of the cylinder through the ports without any movement being imparted to the oil in the conduit. As soon as the ports are closed by the advancing movement of the piston, however, oil is forced through the conduit and the valve is immediately opened. On its return stroke, the piston tends to create a vacuum in the cylinder, thereby causing the piston connected to the valve to be retracted by the atmospheric pressure and the valve is closed.

To provide a simple and improved means for regulating the amount of explosive gases admitted to the cylinders of an internal combustion motor and thereby the speed of the motor, a feature of the present invention contemplates varying the amount of the opening movement of the inlet valves. In the embodiment of this feature of the invention hereinafter described, the opening movement of an inlet valve is varied by varying the amount of oil which is allowed to act in displacing the valve actuating piston. In the preferred construction herein disclosed, this result is attained by the provision of an auxiliary conduit leading from the main conduit together with a valve for regulating the flow of oil from the main conduit through the auxiliary conduit.

In addition to the features of invention above referred to, the present invention also consists in certain constructions, combinations and arrangements of parts, the advantages of which will be obvious to those skilled in the art from the following description, certain of which features are well adapted for use in operating parts other than the valves of internal combustion motors.

The several features of the present invention will be clearly understood from the following description taken in connection with the accompanying drawing in which Fig. 1 is a view partly in section illustrating an embodiment of the invention applied to a valve in the head internal combustion motor of well known design, so much only of the motor being shown as is necessary to indicate the connection of the present invention therewith; Fig. 2 is a detail sectional view taken on the line 2—2 of Fig. 1; Fig. 3 is a detail sectional plan view taken on the line 3—3 of Fig. 1; Fig. 4 is a detail view illustrating one form of port which may be used in controlling the action of the crank actuated pistons; and Fig. 5 is a similar view illustrating an alternative form of port.

Referring to the drawing, one of the pistons of the motor is indicated at 6 and is shown at the limit of its forward stroke in a cylinder 8. An overhead poppet valve of usual construction is indicated at 10, the particular valve shown being an inlet valve arranged to close a port into the intake manifold passage 12. It will be understood that the other valves are similar in construction, there being an inlet and an outlet valve for each cylinder in accordance with the usual practice.

The valve actuating shaft is indicated at 14 and, in accordance with a feature of the present invention, is a crank shaft provided with cranks, one of which is indicated at 16, corresponding in number to the valves of the motor. To actuate the poppet valves from these cranks, each crank is connected by connecting rod 18 to a piston 20 arranged to reciprocate in a cylinder 22. From the upper end of the cylinder 22 a fluid conducting conduit 24 extends upwardly and laterally to a position over the main cylinder head where it communicates with a cylinder 26 arranged vertically in line with a valve 10. A piston 28 is arranged to reciprocate in the cylinder 26 and is secured to the upwardly extending stem of the valve by means of nuts 30 which clamp the closed upper end of the piston against a shoulder on the valve stem. The lower end of the cylinder 26 is open to the air and thus a reciprocation of the piston 20 in the cylinder 22 will cause a forward and backward movement of the oil in the conduit 24 and a corresponding reciprocation of the piston 28 in the cylinder 26. With the parts constructed and arranged as shown, the upward or advancing movement of the piston 20 forces oil through the conduit 24 to open the valve. On its return stroke, the piston 20 tends to create a vacuum, and the atmospheric pressure acting upon the under side of the piston 28 raises the piston and closes the valve. The valve is thus actuated directly in both directions from the crank and with the expenditure of comparatively little energy. For the proper actuation of the valves, no heavy return springs are necessary as is the case with the ordinary cam construction and thus no substantial resistance is offered to the movements of the parts, and the parts are not subjected to injurious strain so that the entire valve operating mechanism can run smoothly and evenly for a practically indefinite period without appreciable wear on the moving parts. To guard against premature opening of the valves, especially when a heavy oil is used, and to regulate the operation of the valves by a very slight resistance to the flow of oil in the conduit 24, the pistons 28 may be supported by light springs, one of which is indicated at 31, the spring being coiled around the stem of the valve and interposed between a shoulder on the valve stem and the closed upper end of the piston.

It is desirable in four-cycle internal combustion motors that the valves be opened and closed during substantially a half revolution of the main crank shaft which corresponds to 90 degrees of revolution of the valve actuating shaft. In the embodiment of the invention illustrated in the drawing, this result is secured by providing a port or ports, indicated at 32, in the walls of each cylinder 22. These ports communicate with a fluid containing chest 34 surrounding all of the cylinders 22, as indicated in Figure 3, and are so located that they are uncovered by the piston 20 during substantially three-quarters of the revolution of the crank shaft 14, during which portion of the revolution the upper end of the piston 20 is below the ports. As a result of this construction and arrangement, no oil is forced through the conduit 24 while the piston 20 is reciprocating in the cylinder 22 below the ports, the oil at this time being allowed to flow freely back and forth between the cylinder and the chest 34 through the ports 32. The valve 10 thus remains closed during three-quarters of the revolution of the crank shaft 14. As soon, however, as the upper end of the piston 20 reaches the ports 32, the ports are closed and continued movement of the piston acts in the manner hereinbefore described to open and then close the valve. It will be noted that the number of degrees of rotation of the crank shaft 14 which is utilized in opening and closing the valve will depend upon the position of the ports 32 with relation to the stroke of the piston and that these ports can be placed so as to cause any desired portion of the revolution of the crank shaft to be utilized. It will also be noted that the ports can be shaped so as to cause a substantially instantaneous opening and closing of the valve and thus maintain the valve in its fully opened position during the entire period of its actuation by the crank. A form of port opening for producing substantially this result is illustrated in Figure 4. If desired, however, particularly as regards the inlet valves, the port openings may be shaped to secure a more gradual opening or closing of the valve. A form of port opening for securing such a result is illustrated at 36 in Figure 5.

A supply of oil is maintained in the chest 34, conduits 24 and the cylinders 22 and 26 by means of a reservoir in the form of a tank 38 which is supported at a level above that of the conduits 24 and connects with the chest 34 by means of a vertical pipe 40. A supply of oil is maintained in this reservoir through a supply pipe 42 which conveniently may lead to a pump in the main crank case of the motor. An overflow pipe 44 leading from the tank 38 to the main crank case maintains the oil in the tank 38 at a constant level.

As has been stated, a feature of the present invention contemplates regulating the speed and power of an internal combustion motor by varying the amount of the opening movement of the inlet valves. In the construction illustrated, this result is secured by providing an auxiliary conduit 46 leading from the conduit 24 to the tank 38. This conduit forms a passageway through which more or less of the oil forced through the conduit 24 by the piston 20 may escape so that more or less of the movement of the piston 20 may be communicated to the piston 28. For varying the amount of oil escaping through the conduit 46, a rotary valve 48 is placed in the conduit and is connected by an arm 50 to a suitable control rod 52.

By closing the valve 48, the valves of the motor may be caused to open to their full extent while, by turning the valve 48 to allow more or less oil to escape through the auxiliary conduit 46, the valves of the motor may be caused to open more or less as may be desired. By regulating the speed of the motor in this manner, the adjustments on the carburetor of the motor may remain fixed and a more even gas mixture and improved results substantially the same at all speeds can be secured.

In addition to affording a means for regulating the amount of valve opening, the auxiliary conduit 46 also provides a vent for air or gases in the oil which, if allowed to remain in the oil, would interfere with the proper actuation of the valves. To provide a vent when the motor is running with the valve 48 completely closed, a shallow groove 54 is formed around the barrel of the valve which is sufficient to give the desired venting action without permitting any appreciable escape of oil.

In all valve mechanisms there is a possibility that, due to one cause or another, a valve may stick and remain in its open position. In the mechanism illustrated in the drawing, injury to the valve mechanism in the event of a valve sticking in its open position is prevented by a safety device consisting of a relief port indicated at 56 normally closed by the valve actuating piston 28 but arranged to be uncovered by an excessive downward movement of the piston, which downward movement might be produced by the action of the oil in the conduit 24 while the valve remained in its open position. Opening of the port 56 allows the oil to be forced through a passage way 58 leading from the port to the atmosphere. A check valve 60 in the passage way 58 serves as a safeguard against the admission of air through the passage and past the piston 28 during the normal operation of the piston.

The operation of the valve mechanism herein disclosed while the motor is running has been sufficiently indicated in the preceding description. When the motor stops, certain of the valves will necessarily be in their open position. In a short time, however, the springs 30, acting on these valves will close the valves so that, so long as the motor is still, all of the valves remain in their closed position, thereby retaining gas in the cylinders and preventing air circulation through the carburetor into the cylinders.

The nature and scope of the invention having been indicated, and an embodiment of the invention having been specifically described, what is claimed is:

1. A valve operating mechanism having, in combination, a crank shaft, a piston, a piston rod connecting the crank shaft and piston, a cylinder in which the piston reciprocates, a fluid conduit leading from the cylinder, a valve actuating member acted upon by the fluid in the conduit when moved in opposite directions by the piston to open and close the valve, and ports in the cylinder wall arranged to permit a flow of fluid into and out of the cylinder and to be closed by the piston during the latter part of the advancing and the first part of the retracting stroke of the piston.

2. A mechanism for operating poppet valves of an internal combustion motor having, in combination, a crank shaft, and connections between the crank shaft and each valve comprising a piston, a piston rod connecting the crank shaft and piston, a cylinder in which the piston reciprocates, a fluid conduit leading from the cylinder and a valve actuating member acted upon by the fluid in the conduit when moved in opposite directions by the piston to open and close the valve, a fluid containing chest surrounding a plurality of the cylinders, and ports in each cylinder wall arranged to permit a flow of fluid between the fluid containing chest and cylinder and to be closed during the latter part of the advancing and the first part of the retracting stroke of the piston in each cylinder.

3. A valve operating mechanism having, in combination, a crank shaft, a piston, a piston rod connecting the crank shaft and piston, a cylinder in which the piston reciprocates, a fluid conduit leading from the cylinder, a valve actuating member acted upon by the fluid in the conduit to open and close the valve, means for causing the piston to move the fluid in the conduit in opposite directions to open and close the valve during the latter part of the advancing and the first part of the retracing stroke of the piston, an auxiliary conduit leading from the main conduit, and means for varying the amount of oil passing through the auxiliary conduit and thereby the opening movement of the valve to regulate the speed of the motor.

4. A valve operating mechanism having, in combination, a crank shaft, a piston, a piston rod connecting the crank shaft and piston, a cylinder in which the piston reciprocates, a liquid conduit leading from the cylinder, a valve actuating piston acted upon by the liquid in the conduit to open and close the valve, means for causing the crank actuated piston to move the liquid in the conduit during the latter part of the advancing and the first part of the retracting stroke of the piston, and a relief port normally closed by the valve actuating piston arranged to be uncovered by an abnormal valve opening movement of the valve actuating piston.

5. The combination with a crank shaft of a piston, a piston rod connecting the crank shaft and piston, a cylinder in which the piston reciprocates, a fluid conduit leading from the cylinder, a reciprocating member actuated by the movement of the fluid in opposite directions in the conduit, and means for causing the piston to move the fluid in opposite directions in the conduit during the latter part of the advancing and the first part of the retracting stroke of the piston.

6. The combination with a crank shaft of a piston, a piston rod connecting the crank shaft and piston, a cylinder in which the piston reciprocates, a fluid conduit leading from the cylinder, a reciprocating member actuated by the movement of fluid in opposite directions in the conduit, and ports in the cylinder wall arranged to permit a flow of fluid into and out of the cylinder and to be closed by the piston during the latter part of the advancing and the first part of the retracting stroke of the piston.

BERNARD T. LEVEQUE.